June 4, 1957
C. D. BERGER
2,794,413
MULTI-TURN DIALS
Filed Aug. 17, 1955
2 Sheets-Sheet 2
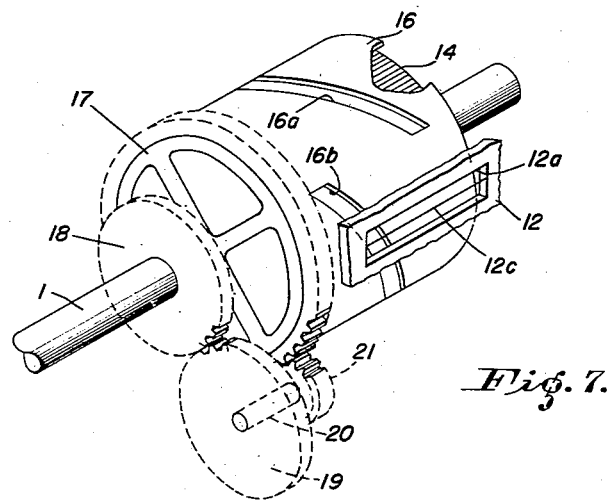
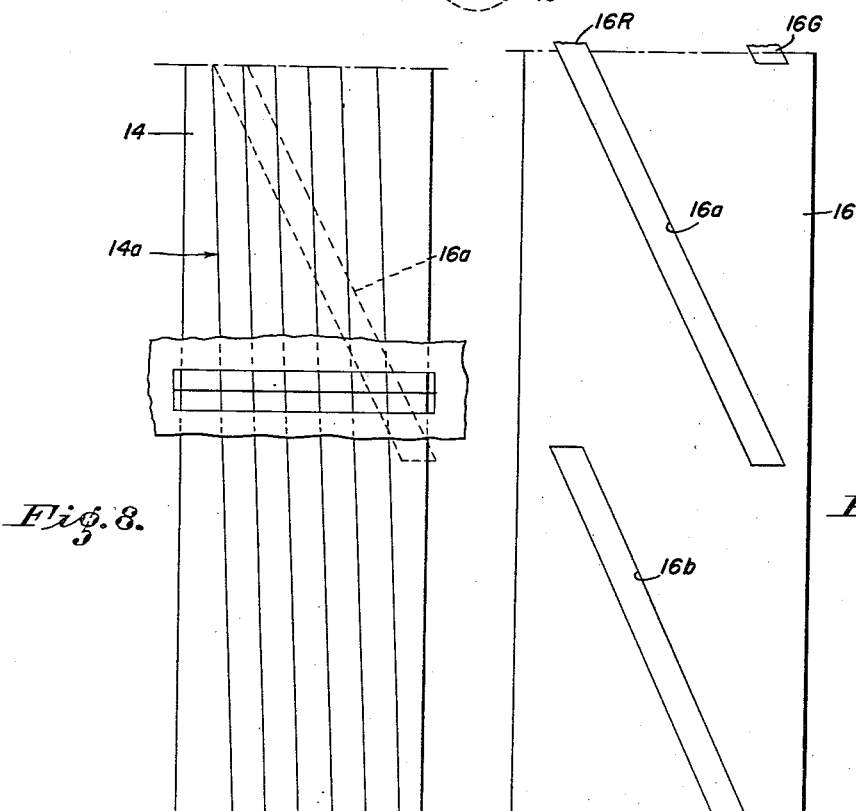
INVENTOR
CHRISTIAN D. BERGER
BY
Ralph B. Stewart
ATTORNEY

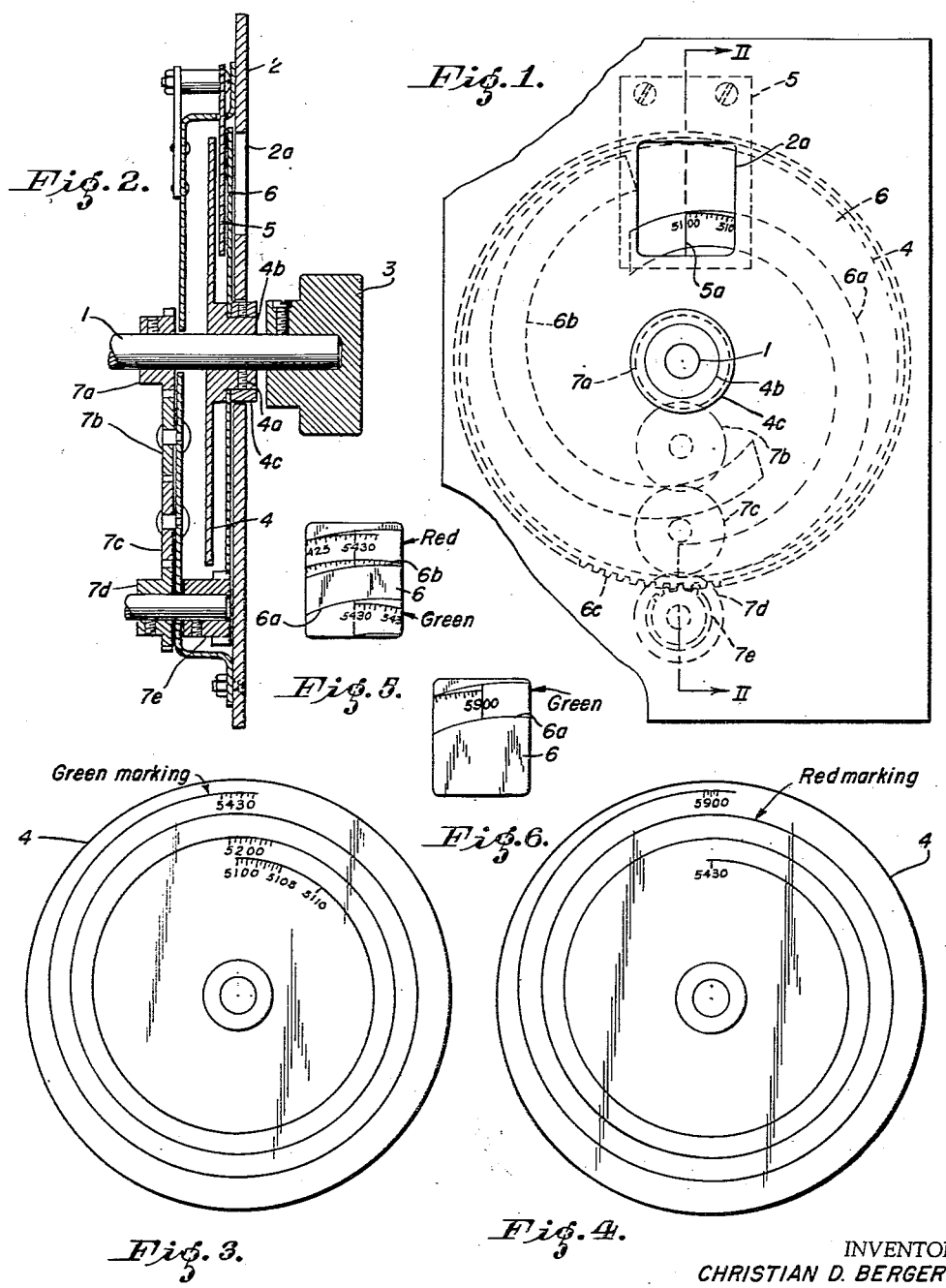

2,794,413

MULTI-TURN DIALS

Christian Dean Berger, New York, N. Y., assignor to Polytechnic Research & Development Company, Inc., Brooklyn, N. Y., a corporation of New York Application August 17, 1955, Serial No. 529,057

10 Claims. (Cl. 116—129)

This invention relates to graduated dials and in particular to dials in which the graduations take the form of a multi-turn spiral. In accordance with the invention, the range or resolution of such a dial may be doubled by super-imposing two sets of graduations and providing suitable apparatus for viewing the two sets of graduations successively. This is accomplished by coloring each of the two sets of graduations with a complementary color and viewing the dial successively through complementary color filters. Throughout this specification and the appended claims, the term "complementary colors" is used to designate colors which are complementary in the sense that a filter of one color will substantially exclude the passage of light of the other color. Thus it is intended to include color combinations which are not complementary in the strictest sense of the word in that the combination of the two colors will not necessarily produce a white or gray color sensation.

A primary object of the invention is to provide a multi-turn dial having twice the effective length of a conventional dial of the same physical dimensions.

Another object of the invention is to provide a dial having two sets of graduations of complementary colors which are viewed successively through complementary color filters in which the transition from one set of graduations to the other is automatic and unaccompanied by confusion as to which set of graduations the reading is to be taken from.

The two sets of graduations are arranged in multi-turn spirals, and the term "spiral" as used hereinafter is to be interpreted as applying to either a flat spiral or a helical spiral.

Two embodiments of the invention are shown in the accompanying drawing in which:

Figure 1 is a front elevational view of a disc type dial with the operating knob removed;

Figure 2 is a sectional view taken along the line II—II of Figure 1;

Figure 3 is a view of one set of graduations;

Figure 4 is a view of a second set of graduations;

Figure 5 is a representation of the appearance of the dial at the mid-point of its range;

Figure 6 shows the appearance of the dial of Figure 1 at the high end of its range;

Figure 7 is a perspective view of a drum type dial according to the invention;

Figure 8 shows the cylindrical dial of Figure 7 in developed form; and

Figure 9 shows the cylindrical mask of Figure 7 in developed form.

Referring to the drawing, a shaft 1 extends through a plate 1 and has an operating knob 3 mounted thereon. In order to indicate the position or condition of the device driven by the shaft 1, a dial member 4 is fixed to the shaft by set-screw 4a which is threaded into boss 4b formed on the dial member and which engages the shaft 1. The dial member 4 is mounted on the shaft 1 on the opposite side of plate 2 from knob 3 so an aperture 2a is formed in the plate 2 in order to allow observation of the graduations on the dial member. A transparent member 5 having a reference line 5a scribed thereon is mounted behind aperture 2a in a fixed position between the dial member 4 and the plate 2.

Two sets of graduations are superimposed on dial member 4. These are shown separately for clarity in Figures 3 and 4. These markings may be applied to a single face of a white or other light-colored dial or they may be formed separately on individual transparent sheets and these sheets mounted on a suitably colored backing plate.

The first set, shown in Figure 3, is colored green and covers the first half of the total range of the dial. The second set, shown in Figure 4, is colored red and covers the last half of the total range of the dial. In this case, the graduations are not uniformly spaced so the midpoint of the range from 5100 to 5900 is 5430. The green scale covers the range from 5100 to 5430. The red scale covers the range from 5430 to 5900. (For the sake of clarity, most of the graduations are not shown, but it should be understood that there is a continuous set of graduations in each scale.) When the two sets of graduations are superimposed, the two 5430 marks are aligned with each other.

It will be understood that a dial such as described above may be used to take readings by counting the number of turns that have been made and from this information referring to the proper convolution and the proper color scale. For instance, readings made during the first turn would be made from the first convolution of the green scale; readings made during the third turn would be made from the third convolution of the green scale; readings made during the fourth turn would be made from the first convolution of the red scale; and so forth. However, it will also be apparent that an attempt to use such a dial would be extremely confusing and would very likely result in erroneous readings.

To make the use of such a dial practical, a mask 6 having two spiral apertures 6a and 6b is provided. Aperture 6a is provided with a red filter and aperture 6b is provided with a green filter. The mask 6 is mounted between the plate 2 and the transparent member 5 so that it is free to turn on the boss 4a of dial member 4. A collar 4c is secured to the boss 4b to position the mask 6 on the boss. The outer edge of the mask 6 has gear teeth 6c formed therein and a gear train formed of gears 7a, 7b, 7c, 7d and 7e drives the mask 6 in the same direction but at approximately ⅙ the speed of the shaft 1 and dial member 4.

It will be seen from Figure 1 and the above description that during the first three turns of shaft 1 and dial member 4, the dial will be viewed through the red spiral aperture 6a in mask 6 and that during the last three turns the dial will be viewed through the green spiral aperture 6b. The slope of the two spiral apertures 6a and 6b is such that only the convolution of the spiral scale that corresponds to the number of turns that have been made by dial member 4 may be viewed through the aperture. Thus during the first three turns of the dial member 4, when the dial is viewed through the red filter in spiral aperture 6a, the red graduations will appear to be invisible and the green graduations will appear to be black, while during the last three turns of the dial the green graduations will appear to be invisible and the red graduations will appear to be black.

Since the spiral apertures 6a and 6b in mask 6 permit only one convolution to be viewed at a time, there is no possibility of taking a reading from the wrong convolution and since the filters in the spiral apertures make only one set of graduations visible at a time, there is no possibility of taking a reading from the wrong scale. Of course, for a short space during the transition from one scale to the other, both scales will be visible. However, as shown in Figure 5, one scale will be visible in one spiral aperture and the other scale will be visible in the other spiral aperture. Furthermore, during this transition period a reading taken from either scale will be the same so it is immaterial which scale the reading is taken from. The appearance of the dial at the low end of its range is shown in Figure 1 and the appearance at the high end of the range is shown in Figure 6.

In Figures 7, 8 and 9 I have illustrated a drum or cylindrical type of dial according to my invention.

As shown in Figure 7, the dial member carried by shaft 1 comprises a cylindrical member 14 arranged behind the panel 12 having a viewing slot 12a formed therein. The slot 12a may be covered by a sheet of transparent material carrying the horizontal index line 12c. Only a fragmentary part of the panel 12 has been shown in Figure 7.

Surrounding the dial member 14 is a cylindrical mask member 16 having two spiral apertures 16a and 16b formed therein and through which the graduations on the dial member 14 are viewed through the aperture 12a. The mask 16 is carried by gear 17 which is mounted for rotation about the axis of the shaft 1 independently of the shaft. A driving connection is provided between shaft 1 and the mask 16 to drive the mask at a reduced speed with respect to the shaft 1. This driving connection includes a gear 18 secured to shaft 1 and meshing with gear 19 carried by countershaft 20 journalled in a fixed bearing (not shown) and a pinion 21 carried by the shaft 20 and engaging the gear 17. The drive ratio of the connection between the shaft 1 and the mask 16 will depend upon the number of convolutions in the graduation spiral carried by the drum dial 14.

As shown in Figure 8, the two sets of graduations marked in two different colors, are arranged along a spiral line 14a formed of six turns or convolutions. The two helical slots 16a and 16b are formed in the mask 16 in the manner shown in Figure 9. Each slot covers slightly more than one-half the periphery of the mask and is arranged at an angle to the axis of the mask so that each aperture spans all of spiral line 14a on the drum 14. The two spiral apertures 16a and 16b are provided with windows formed of color filters, such as the red filter marked 16R and green filter 16G.

In the example shown in Figures 8 and 9, where the two sets of graduations are arranged in a spiral of six turns, the green markings will be visible through the aperture 16a during the first six turns of the shaft 1, and the red markings will be visible through the aperture 16b during the next six turns of the shaft 1. Thus, the drive ratio of the connection between the shaft 1 and the mask 16 in the example should be 12 to 1.

From the foregoing it will be understood that the two sets of graduations may be arranged in any desired number of convolutions by providing the proper ratio of the gear train which drives the mask and by having the spiral apertures span the entire range of the graduation spiral. The two graduation spirals extend in parallel relation over a common angular range of the dial, while the two apertures in the mask are in tandem and cover different angular ranges of the mask.

I claim:

1. An indicator of the type having a dial member and a reference marker which are relatively rotatable wherein the dial member has two sets of graduations superimposed thereon, each set of graduations being in the form of a multi-turn spiral and of a color complementary to the color of the other, and including a rotatable mask having two spiral apertures formed therein, one of said apertures being provided with a filter of a color corresponding to one of said complementary colors, the other of said apertures being provided with a filter of a color corresponding to the other of said complementary colors, and means to rotate said mask at a fraction of the relative rate of rotation between said dial member and said reference marker.

2. An indicator comprising a rotatable dial member having two sets of graduations superimposed thereon, each set of graduations being in the form of a multi-turn spiral and of a color complementary to the color of the other, a stationary reference marker, a rotatable mask having two spiral apertures formed therein, one of said apertures being provided with a filter of a color corresponding to one of said complementary colors, the other of said apertures being provided with a filter of a color corresponding to the other of said complementary colors, and means to rotate said mask at a fraction of the rate of rotation of said dial member.

3. An indicator in accordance with claim 2 wherein said complementary colors are red and green.

4. An indicator in accordance with claim 2 wherein said mask is provided with gear teeth about the circumference thereof and said mask rotating means comprises a gear train engaging said gear teeth and driven by rotation of said dial member.

5. An indicator in accordance with claim 2 having $n$ convolutions in each of said sets of graduations wherein said fractional rate of rotation is approximately $$\frac{1}{2n}$$

times the rate of rotation of said dial member.

6. An indicator comprising a rotatable dial member having two sets of graduations superimposed thereon in parallel relation over a common angular range of the dial, each set of graduations being in the form of a multi-turn spiral and of a color complementary to the color of the other, a stationary reference marker, a rotatable mask having two spiral apertures formed therein in tandem relation and covering different angular ranges of the mask, one of said apertures being provided with a filter of a color corresponding to one of said complementary colors, the other of said apertures being provided with a filter of a color corresponding to the other of said complementary colors, and means to rotate said mask at a fraction of the rate of rotation of said dial member.

7. An indicator according to claim 6 wherein said dial member and said mask are in disc form.

8. An indicator according to claim 6 wherein said dial member and said mask are in the form of concentric cylinders.

9. An indicator comprising a rotatable shaft, a dial disk mounted for rotation with said shaft and having a multi-turn spiral scale on one face thereof, index means presenting an index line for visual intersection with each turn of the spiral scale in any position of the disk, an opaque mask disk located in front of said dial disk and said index means and having a spiral slot formed therein, means mounting said mask disk for rotation about the axis of said shaft, and gear means connecting the shaft with said mask disk for rotating the mask disk at a predetermined speed slower than the rotation of said dial disk to permit observation of successive points of intersection between the index line and the successive turns of the multi-turn spiral scale upon each successive revolution of the dial disk.

10. An indicator comprising a rotatable shaft, a dial member mounted for rotation with said shaft and having a multi-turn scale formed on the surface thereof, index means presenting an index line for visual intersection with each turn of said scale in any position of said dial member, an opaque mask member positioned to mask the scale on said dial member and having a spiral slot formed therein, means mounting said mask member for rotation about the axis of said shaft, and gear means connecting the shaft with said mask member for rotating the mask member at a predetermined speed slower than the rotation of said dial member to permit observation of successive points of intersection between the index line and the successive turns of the multi-turn scale upon each successive revolution of the dial member.

No references cited.